Dec. 9, 1924.

H. G. CORDLEY ET AL

FAUCET

Filed Jan. 7, 1924

1,518,775

Inventor

H. G. Cordley & Geo. R. Long

By

Attorney

Patented Dec. 9, 1924.

1,518,775

UNITED STATES PATENT OFFICE.

HENRY G. CORDLEY, OF GLEN RIDGE, NEW JERSEY, AND GEORGE R. LONG, OF WATERBURY, CONNECTICUT.

FAUCET.

Application filed January 7, 1924. Serial No. 684,827.

*To all whom it may concern:*

Be it known that we, HENRY G. CORDLEY, residing at Glen Ridge, Essex County, State of New Jersey, and GEORGE R. LONG, residing at Waterbury, county of New Haven, State of Connecticut, both being citizens of the United States, have invented certain new and useful Improvements in Faucets, of which the following is a specification, reference being had to the accompanying drawing, forming a part thereof.

Our invention relates to faucets and has for its object to provide means in faucets of the push-button type for ensuring a positive simple and non-leaking joint between the sections which make up the shell of such a faucet and for so holding the gasket against which the valve of such faucet seats itself as to prevent movement of the gasket.

With the objects above indicated and other objects hereinafter explained in view our invention consists in the construction and combination of elements hereinafter described and claimed.

Referring to the drawings.

Figure 1:
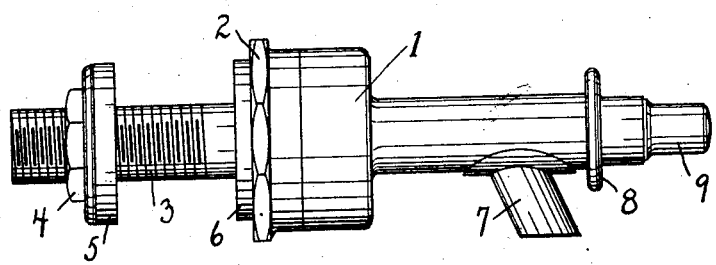
Figure 1 is a side view of a faucet of the type to which our invention is applicable.

In the drawings, 1 indicates the main shell of the faucet, 7 indicates the spout, 8 indicates a ring shoulder and 9 indicates the end of the push pin. The base portion 2 of the shell of the faucet has a threaded pipe portion 3 on which the usual nut 4 and rubber washer 5 are carried. Another rubber washer 6 also fits over the pipe portion 3 and against the back of the base portion 2. The faucet is intended to be connected with a tank or container by inserting the pipe portion 3 in the usual faucet hole and then screwing down the nut 4 so that washers 5 and 6 will bear firmly on the inside and outside walls of the tank.

Figure 2:
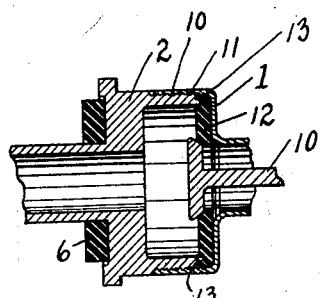
Figure 2 is a partial sectional view of the faucet showing the joint.

As shown in Figure 2, the main shell 1 of the faucet is screwed onto the base portion 2, the shell 1 having its flange 11 internally threaded at 11 and the base portion being externally threaded at 10. An annular rubber gasket 12 is mounted in the shell 1 and serves to make the joint between the shell 1 and the base portion 2 watertight. This gasket 12 also serves as a valve seat against which the valve plunger 15 is held by the usual spring except when the button 9 is pushed in.

Figure 3:
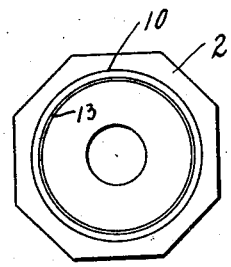
Figure 3 is an end view of the base of the faucet.
Figure 4:
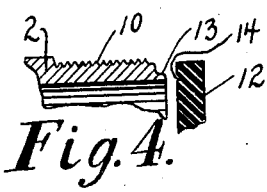
Figure 4 is an enlarged partial sectional view of the joint in detail.

The particular feature of our invention is best shown in Figures 3 and 4. We form the forward end of the base portion 2 which bears against the gasket 12 with a narow annular ridge 13 on the inner circumference of the end of the base portion 2. This ridge 13 being at the inner edge of the threaded flange 10, the pressure as the base portion is screwed into the screwthreaded flange 11, causes the ridge to form an annular depression 14 in the gasket 12 and thereby makes an effective liquid tight seat. This annular depression 14 being inside the outer circumferential edge of the gasket 12, any roughness of the gasket edge will not affect the seating.

The ridge 13 is, in practice, made of slight height so as to avert any tendency to cut into the gasket.

The ridge 13 being narrow is readily forced into the material of the gasket and acts to spread the material radially to force its peripheral edge outward into close contact with the base of the flange 11 as well as against the flat wall of shell 1 and as the ridge is of relatively slight height and is arranged at the inner edge of the flange 10, the portion of the gasket which is forced outward by the ridge is kept from undue spreading by the outer portion of the end of the flange.

Having thus described our invention what we claim is:—

In a faucet of the type described having a shell provided with an internally threaded rearwardly extending flange and a base portion having an inlet opening through it and provided with a forwardly extending flange screwthreaded to fit the flange of the shell, an annular gasket of resilient material surrounding the discharge opening, and a relatively narrow annular ridge formed on the inner edge of the inner end of the flange of the base portion adapted to enter the material of the gasket at a distance from its periphery insuring a tight joint without unduly spreading or depressing the gasket.

In testimony whereof we hereunto affix our signatures.

HENRY G. CORDLEY.
GEORGE R. LONG.